Jan. 3, 1928.
J. A. STEVENS
1,655,203
SHOCK ABSORBER
Filed Oct. 5, 1925
3 Sheets-Sheet 1
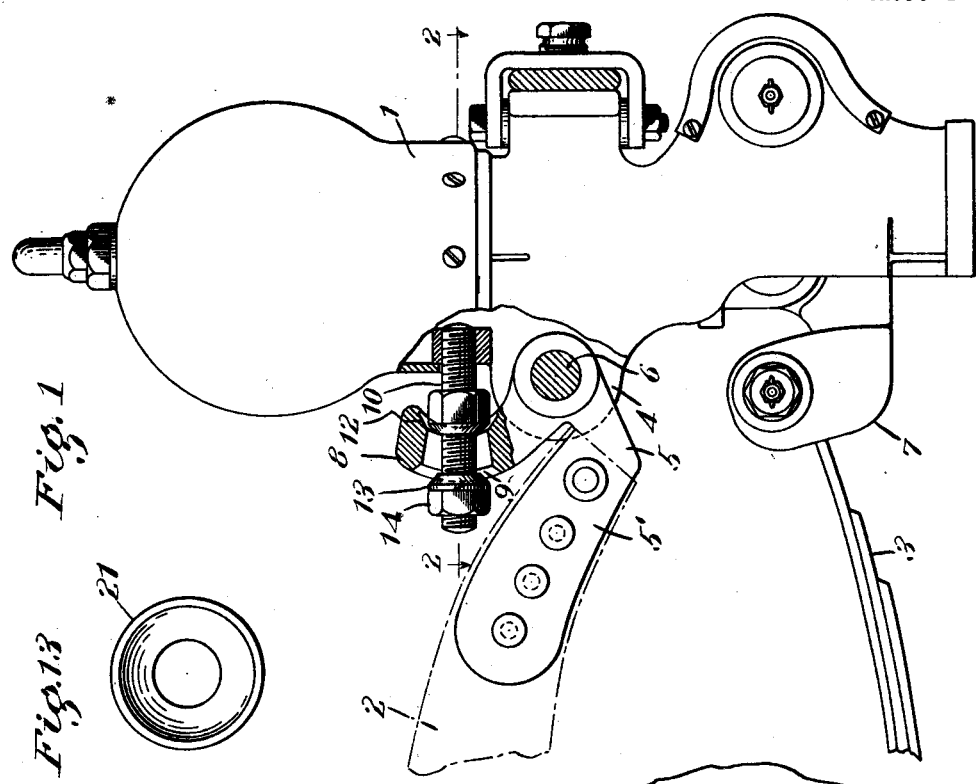
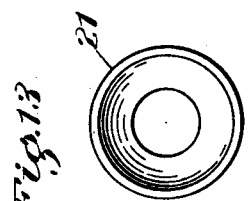
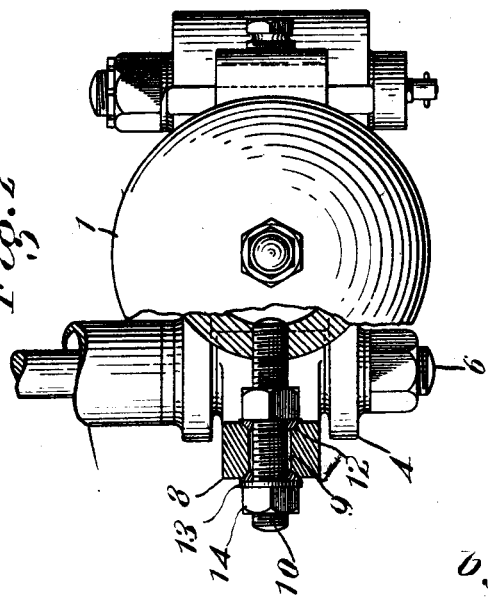
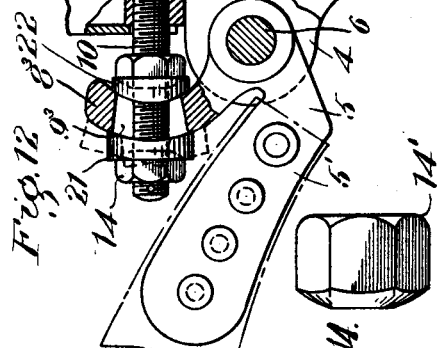
Inventor:
John A. Stevens.
by Roberts, Roberts & Cushman
Att'ys.

Jan. 3, 1928.
J. A. STEVENS
1,655,203
SHOCK ABSORBER
Filed Oct. 5, 1925
3 Sheets-Sheet 2
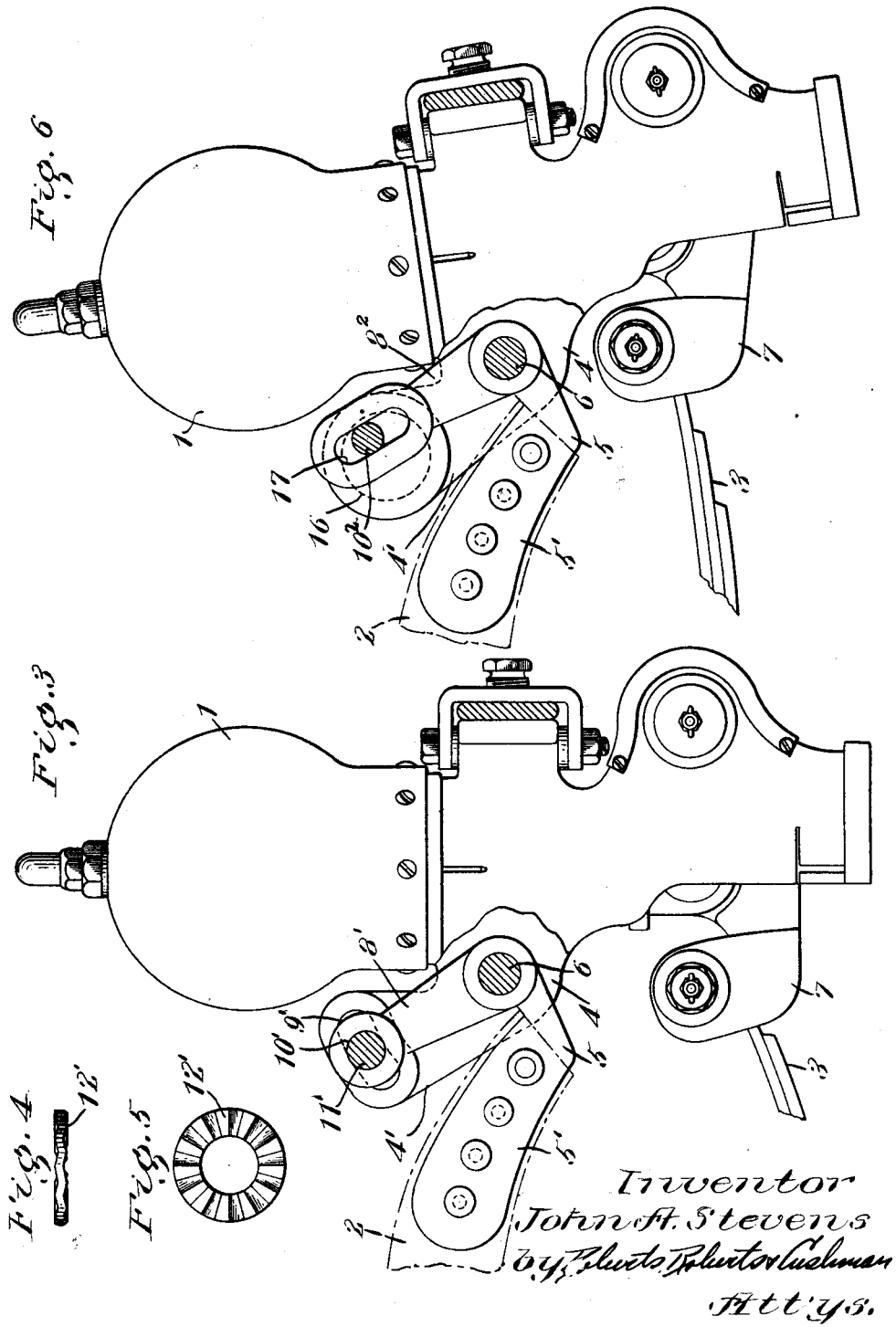
Inventor
John A. Stevens
by Plucto Robertson Cushman
Att'ys.

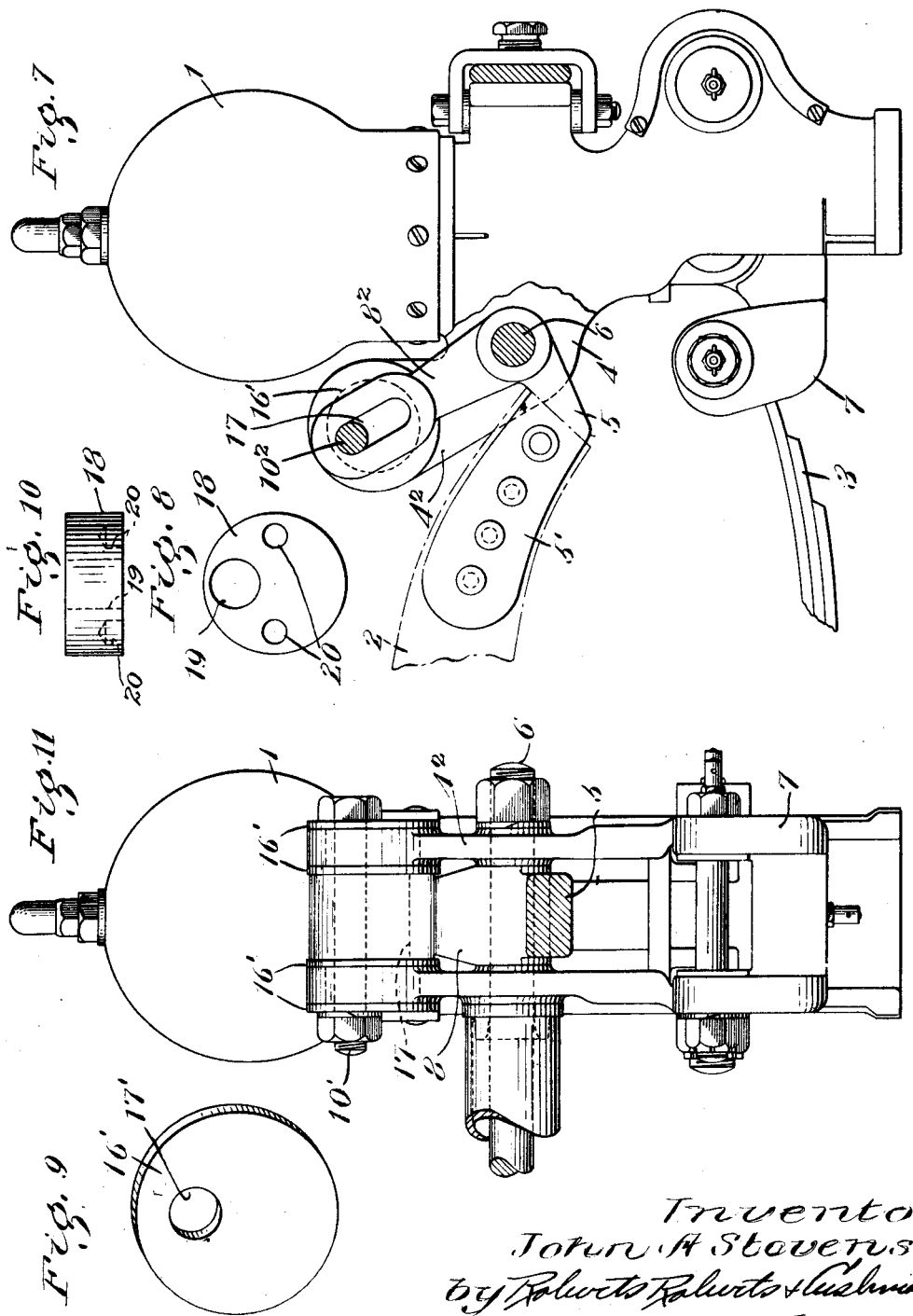

Patented Jan. 3, 1928.

1,655,203

UNITED STATES PATENT OFFICE.

JOHN A. STEVENS, OF LOWELL, MASSACHUSETTS, ASSIGNOR TO STEVENS PRODUCTS COMPANY, OF LOWELL, MASSACHUSETTS, A CORPORATION OF DELAWARE.

SHOCK ABSORBER.

Application filed October 5, 1925. Serial No. 60,372.

This relates to an improvement in shock absorbers adapted to be positioned between the usual springs and chassis of a vehicle whereby the body of said shock absorber is rigidly mounted with respect to the chassis of said vehicle without it being necessary to drill additional holes in the chassis in order to prevent pivotal movement of said shock absorber relative thereto. The mounting of shock absorbers on automobiles and other vehicles, prior to this invention, where such devices are positioned between the chassis and springs of the vehicle has been a laborious and time consuming operation. Heretofore it has been necessary to either provide the body of a shock absorber with a brace rod having one end attached thereto and its other end bolted to a portion of the chassis or frame of the vehicle, or cut the frame and apply a special flange and bolted member thereto, in order to prevent the shock absorbing device from pivoting about the longitudinal axis of the bolt attaching the body of the shock absorber to the chassis of the vehicle. This method of mounting the shock absorber makes it necessary to bore holes through the steel frame or chassis of the vehicle in order to accommodate the brace rod or cut the frame to apply the special flange and bolted member. This obviously makes the task of providing a vehicle with a shock absorber slow and expensive and seriously interferes with the changing of a shock absorber from one vehicle to another.

Objects of this invention are to overcome the difficulties above enumerated by providing means for readily mounting a shock absorber relative to the chassis of the vehicle without it being necessary to cut or drill additional holes therein; to provide for the ready removal or change of the shock absorber from car to car; to provide a shock absorbing device with a bracket adapted to fit the usual holes drilled in the chassis of the vehicle and rigidly positioning said shock absorber with respect to said chassis; to provide a shock absorber easily and readily positioned between the springs and chassis of a vehicle with minimum expenditure of time and labor; and to provide a shock absorber with a bracket member having adjustable means permitting said shock absorber to be rigidly positioned with respect to chassis of various sizes and curvatures. Other objects of the invention will be manifest from the detailed description and appended claims hereinafter set forth.

For purposes of illustration the device is shown in the accompanying drawings forming a part of this specification in which, Fig. 1 is a side elevational view of a shock absorber mounted between the chassis and springs of a vehicle with certain parts in section illustrating the preferred construction whereby the shock absorber is rigidly and adjustably mounted relative to the chassis;

Fig. 2 is a top plan view of the device shown in Fig. 1;

Fig. 3 is a side elevational view of a modification of the device shown in Fig. 1;

Fig. 4 is a view in perspective of a crimp washer employed in the device shown in Fig. 3;

Fig. 5 is a plan view of the crimp washer shown in Fig. 4;

Fig. 6 is a side elevational view of another modification showing the position of the eccentric ring and pin when the shock absorber is out of vertical position;

Fig. 7 is a side elevational view of the device shown in Fig. 6 with the shock absorber in a normal vertical position;

Fig. 8 is a plan view of the eccentric ring employed in the device shown in Fig. 7;

Fig. 9 is a view in perspective of the shield washer employed;

Fig. 10 is an elevational view of the eccentric ring;

Fig. 11 is a rear elevational view of the shock absorber at right angles to the view shown in Figs. 6 and 7;

Fig. 12 is a view similar to the view shown in Fig. 1, but with the shock absorber removed illustrating a modified form of the washer employed;

Fig. 13 is a view in elevation of one of the washers shown in Fig. 12; and

Fig. 14 is an elevation of a combined nut and beveled washer.

As illustrated the numeral 1 designates as a whole a shock absorber adapted to be mounted between the chassis 2 and the springs 3 of the vehicle. While the shock absorber 1 is shown to be of the pneumatic type, it is to be understood that this invention may be applied to any shock absorber adapted to be mounted between parts movable relative to each other. In the pneumatic shock absorber 1 the body thereof is shown as having ears 4 receiving a portion of the bracket or quadrant 5, said ears and bracket being attached together through the medium of a bolt or pin 6. As will be readily understood by one skilled in the art, the springs 3 are attached to an arm 7 which in turn is attached to the piston rod having a piston (not shown) which reciprocates in the pneumatic chamber of the shock absorber, whereby the shocks received by the vehicle are neutralized. The chassis 2 ordinarily carries a bracket member fastened thereto at the point of attachment of the bracket member 5, said bracket member being attached directly to the springs 3. Heretofore it has been customary to attach the bracket member carried by the chassis directly to the body of the shock absorber 1 and then provide a brace rod running from said shock absorber and bolted to the top of the member 2 or cut the chassis and apply a special flange and bolted members thereto. This of course necessitated cutting or drilling additional holes in the chassis 2. As illustrated in Fig. 1 the bracket or quadrant member 5 comprises an arm 5', adapted to be bolted to the chassis 2 through the bolt openings already formed therein, and slightly curved arm 8 integral therewith and projecting at an angle relative to the arm 5'. An elongate opening 9 formed in the arm 8 of the bracket 5 is adapted to receive a screw or bolt 10 having one end threaded into the body of the shock absorber. The elongate opening 9 has countersunk recesses 12 adapted to receive the bevelled washers 13 which are pressed into tight engagement therewith by the nuts 14 whereby the shock absorber is rigidly locked against movement relative to the bracket 5 and arm 8. Inasmuch as the chassis 2 is not of the same curvature and shape on all types and makes of cars it will be apparent that the elongate opening 9 allows such an adjustment as to permit the shock absorber 1 to be mounted in a vertical position relative to chassis of various types and curvatures.

Figs. 3 to 5 inclusive show a modified form of the device illustrated in Fig. 1 wherein the ears 4 are projected upwardly forming arms 4', having elongate horizontal slots 9'. The arm 8 of the bracket 5 projects upwardly between the arms 4' and has an opening 10' receiving the bolt 11' extending through the elongate slot 9'. A crimp washer 12' shown in Figs. 4 and 5 receives the bolt 10' and is adapted to be inserted between the arm 8' and the sides of the arms 4' in order to lock said arms 8' and 4' against relative movement. The elongate slot 9' and structure above described also provides means for compensating for various types of chassis 2.

Figs. 6 to 11 inclusive illustrate a further modification of the device shown in Figs. 1 and 5 in which the arms $4^2$ have enlarged openings 16 and the arm $8^2$ has an elongate vertical opening 17, said openings 16 and 17 receiving the bolt $10^2$. An eccentric ring 18, Figs. 8, 9, 10, has an opening 19 therein adapted to receive the bolt $10^2$ said ring being inserted within the openings 16 in the arms $4^2$, suitable openings 20 being provided for actuation of the ring 18 in order to properly line up the shock absorber. Shield washers 16' having openings 17' adapted to receive the pin $10^2$ are positioned on opposite sides of the arms $4^2$ in order to retain the cam washer 18 in position. Fig. 6 illustrates the position of the pin 10' when the shock absorber is improperly aligned while Fig. 7 shows the position of the pin 10' when said shock absorber has been moved from the position shown in Fig. 6 into proper alignment.

As illustrated in Fig. 12 washers 21 and 22, having concave and convex surfaces respectively cooperating with corresponding surfaces on the arm $8^3$ adjacent the elongate opening $9^3$, are substituted for the bevelled washers 13 shown in Fig. 1. The construction shown in Fig. 12 obviates the necessity of providing the elongate opening $9^3$ with the countersunk recesses 12 shown in Fig. 1 and at the same time provides a structure whereby the shock absorber is rigidly locked against movement relative to the bracket 5 and arm $8^3$. The three modified forms of the device described all illustrate a structure usually obviating the necessity of cutting or boring additional holes in the chassis 2, the holes in the bracket 5 being arranged to align with the holes in most chassis as now standardized; at the same time permitting the shock absorber to be vertically aligned relative to said chassis through adjustments compensating for chassis of various types and curvatures.

From the foregoing it will be evident that the shock absorber is held against angular movement relative to the chassis with a single bracket without using a second connection between the chassis and shock absorber to brace the absorber against angular movement.

Fig. 14 illustrates as a possible modification a combined nut and beveled washer usable in the forms of the device shown in Figs. 1 and 12.

While I have shown various modifications of the basic invention, I do not wish to be limited to any of the form or forms here illustrated, but merely by the scope of the appended claims.

I claim:

1. A bracket for attaching a shock absorber to a vehicle chassis comprising an arm shaped to fit against the side of the chassis with horizontal bolt openings therein, and an integral arm having openings parallel to said openings for attachment to the shock absorber, said last openings being spaced apart, and means associated with the absorber to permit angular movement thereof relative to the chassis.

2. A bracket for attaching a shock absorber to a vehicle chassis comprising an end for attachment to the chassis, means for pivotally attaching the bracket to the shock absorber intermediate its ends, and means at the other end of the bracket for holding the shock absorber in fixed angular relation to the bracket in various positions of adjustment.

3. In a shock absorber adapted to be mounted between the springs and chassis of a vehicle, the combination of a metal bracket having arms projecting from its intermediate portion, one of said arms being rigidly attached to chassis of said vehicle and the other of said arms being adjustably and rigidly attached to the body of a shock absorber, whereby relative movement between said body and chassis is prevented.

4. In combination with a shock absorber adapted to be mounted between the springs and chassis of the vehicle, a bracket having an intermediate portion attached to the shock absorber, an arm extending from the intermediate portion of said bracket and attached to said chassis, and an arm extending from the intermediate portion of said bracket at an angle to said first mentioned arm and adjustably attached to said shock absorber.

5. In combination with a shock absorber adapted to be mounted between the springs and chassis of a vehicle, a metallic bracket member having an intermediate portion attached to the body of said shock absorber, a projecting portion attached to the chassis of said vehicle and an upstanding arm rigidly and adjustably attached to the body of the shock absorber whereby relative movement between said shock absorber and chassis is prevented.

6. In a shock absorber comprising a body having projecting ears and adapted to be mounted between the springs and body of a vehicle, the combination of a bracket attached to the ears of said shock absorber, said bracket having a plurality of projections, one of which is rigidly attached to said chassis and the other of which is rigidly attached to the body of the shock absorber above said ears, means being provided in said last mentioned projection for adjustably mounting the shock absorber relative to said chassis, and means for locking said shock absorber in adjusted position.

7. In a shock absorber adapted to be mounted between the springs and chassis of a vehicle, the combination of a metallic bracket having a portion attached to the body of said shock absorber, an arm projecting from said bracket attached to said chassis, an arm projecting from said bracket at an angle to said first mentioned arm having an elongate opening therein, a pin attached to the body of said shock absorber and projecting through the opening in said last mentioned arm, whereby said shock absorber may be adjustably positioned relatively to said arm and chassis, and means for locking said shock absorber in adjusted position.

8. A device for mounting a shock absorber on a vehicle comprising a portion for fixed attachment to the vehicle, an integral portion for pivotal attachment to the shock absorber and adjustable means for holding the shock absorber in different angular positions relative to the axis of its pivotal attachment.

9. A device for mounting a shock absorber on a vehicle comprising a bracket having portions meeting at an angle, means at said angle for attachment to the shock absorber, one of said portions being adapted for attachment to the chassis of a vehicle and the other of said portions adapted for attachment to the shock absorber, whereby said shock absorber may be rigidly mounted in a vertical position relative to chassis of various types and curvatures.

10. A device for mounting a shock absorber on a vehicle comprising a bracket having two portions meeting at an angle, means at said angle for pivotal attachment to a shock absorber, one of said portions being shaped for rigid attachment to a vehicle, and means associated with the other of said portions for holding the shock absorber in different angular positions relative to the axis of its pivotal attachment.

Signed by me at Lowell, Massachusetts, this second day of October, 1925.

JOHN A. STEVENS.